United States Patent Office 3,223,270
Patented Dec. 14, 1965

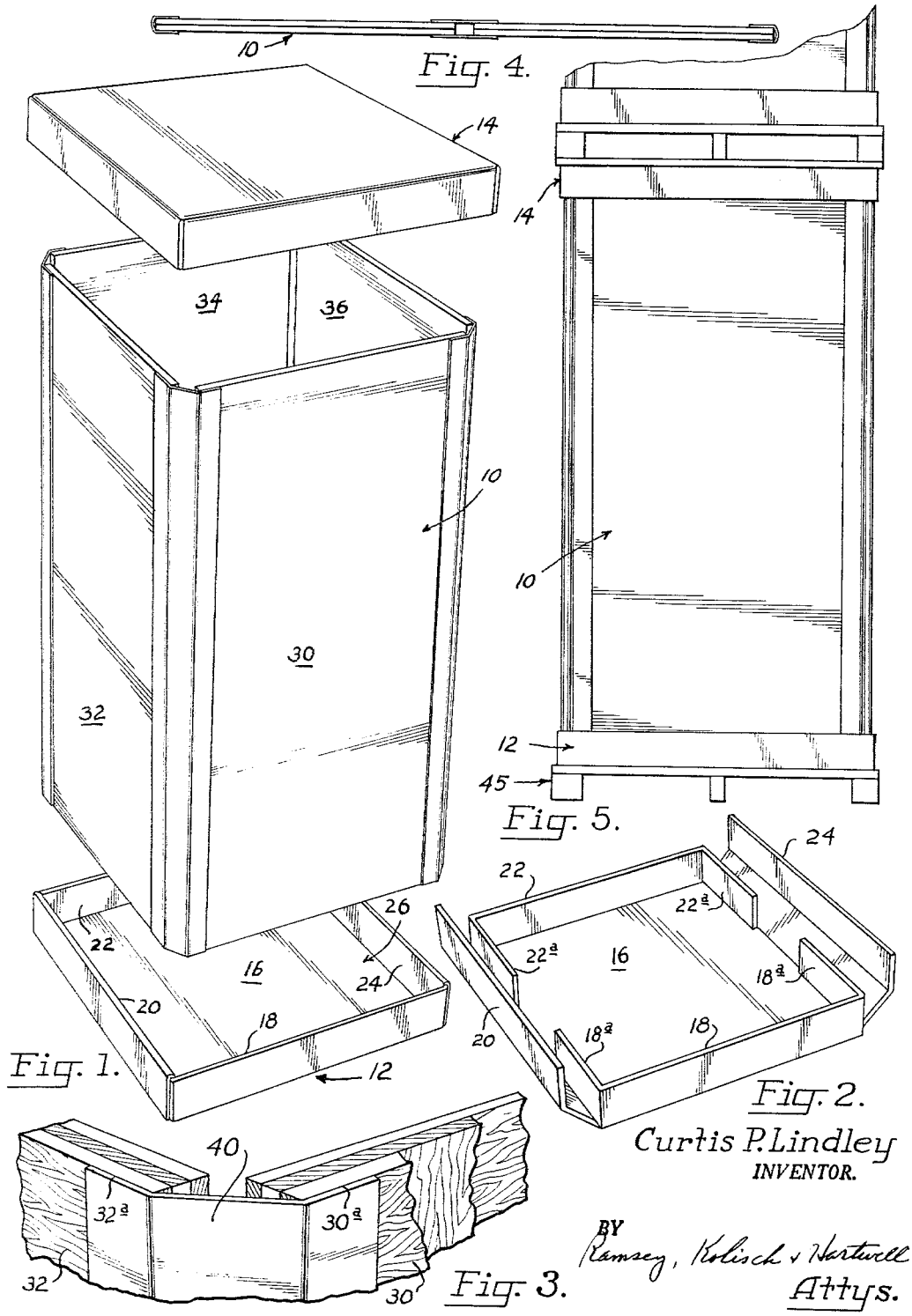

3,223,270
BULK CONTAINER
Curtis P. Lindley, Portland, Oreg., assignor to Centennial Mills Inc., Portland, Oreg., a corporation of Oregon
Filed Apr. 9, 1963, Ser. No. 271,796
1 Claim. (Cl. 217—16)

This invention relates to a novel bin or container, and more particularly relates to such a bin or container that may be used in the transporting, storing, or other handling of bulk material, such as flour and the like.

Generally, an object of this invention is to provide an improved, relatively low cost, reuseable bulk container, suitable for use in handling flour, grain, and like materials.

Another general object is to provide a container of the above general description, capable of withstanding, to a greater degree than ordinary containers, the usual wear and tear to which such containers commonly are subjected. Further, the container features a number of separate and distinct elements making up the container, which are easily removed, so that should part of the container be damaged, only the damaged portion need be replaced and the entire container need not be discarded.

Thus, another general object is to provide an improved bin or container, which can hold a large mass of material, without distortion or rupturing of its walls. A container constructed according to the invention, and when filled with material such as flour, is capable of supporting a like container, filled with material, stacked on top thereof, without the additional weight of the superimposed container producing rupturing of its walls.

In the handling of materials such as flour, a number of considerations are involved which are somewhat unique, and which have made ordinary containers not entirely satisfactory. By way of explanation, bulk containers have been used as receptacles for holding flour, since if properly designed, they lend themselves to ready stacking in confined spaces, and unlike flour sacks, they may be fumigated and reused. However, in order for the containers to be fumigated efficiently prior to reuse, and to facilitate economical shipment back to the flour mill, they should be collapsible, and not only collapsible but also sufficiently opened up when collapsed so as to accomodate the circulation of a fumigating gas over all portions thereof. There is the further consideration that flour (and like material), although not a liquid, has a certain amount of flowability, and resembles a liquid in certain respects. Thus, flour, like a liquid, will tend to "round out" a container having a square cross section when the container is filled, and also exerts at the base of such a container forces directed outwardly against the walls of the container which are related to the height of the flour within the container. Because of this the usual lightly constructed and flexible-walled container is impractical, as such will not retain its shape, and tends to burst apart at the bottom, when filled with flour.

In general terms, the container of this invention fulfills the requirements of being easily disassembled, and retaining its square shape even when filled.

These and other objects and advantages are attained by the invention, and the same is described hereinbelow in conjunction with the accompanying drawings, wherein:

FIG. 1 is a perspective view, resembling an exploded view, illustrating the container of the invention;

FIG. 2 is a perspective view, illustrating a bottom cap in the container contemplated, and showing the bottom cap partially disassembled;

FIG. 3 is an enlarged, perspective view, of portions of the container shown in FIG. 1, and illustrating the construction of panels in the container;

FIG. 4 shows a shell portion in the container, as the same looks when collapsed, as for the purpose of shipping the container back to the flour mill; and FIG. 5 is a side elevation, illustrating a filled container loaded on a conventional pallet, and showing portions of another container stacked thereover.

Referring now to the drawings, the container illustrated in FIG. 1 comprises a hollow shell portion with openings at top and bottom ends thereof, indicated at 10, and bottom and top end caps 12 and 14, which in operative position are placed over the ends of the shell portion and function to close off the openings at these ends. The end caps are separable from the shell portion, and should either of the end caps be damaged, they may be replaced, and the remainder of the container reused as before. The end caps are similar, and only one is described in detail.

Referring now to FIGS. 1 and 2, and more specifically describing bottom cap 12, the cap (which may be made of cardboard or other flexible, stiff material), comprises a base 16, of substantially rectangular outline, and four elongated margins, indicated at 18, 20, 22 and 24, that extend along the side edges of base 16 and project upwardly therefrom. The margins project upwardly in substantially vertical planes, and form a shallow recess of substantially rectangular outline over the top of the bottom cap, such recess being indicated at 26.

With the end cap made of cardboard, or similar flexible and stiff material, the construction shown in FIG. 2 may be employed for the end cap. Thus, and referring to FIG. 2, it will be seen that margins 20, 24 comprise flaps folded over in the completed end cap to make a double thickness. Margins 18, 22 may comprise a single thickness of cardboard, folded at right angles to base 16. Tongue portions 18a, 22a integral with the flaps forming margins 18, 22, and remaining after the cutting of flaps 20, 24 from a rectangular cardboard piece, are lodged between the double over portions of flaps 20, 24 in the completely assembled end cap. The structure described comprises means detachably anchoring the margins to each other in their upwardly projecting position.

Other constructions for the end cap are possible, but the construction just described is preferable, as it enables the use of a readily available, economical material such as cardboard. The important requirement in the container contemplated is that there be provided the upstanding margins described, and that these margins be detachably anchored in their upwardly projecting position (to accommodate flattening out of the end cap for the purpose of shipment). In the complete container, the margins of the bottom end cap perform the very important function of bounding and thus confining the sides of shell portion 10, when the latter is mounted over the top of the bottom end cap.

Considering now the construction of shell portion 10, this comprises four vertical panels, indicated at 30, 32, 34, 36, forming the sides of the shell portion. The panels are disposed with one pair opposite each other, and at right angles to and between the other pair of panels, whereby a shell of rectangular cross section, and open at top and bottom ends, is formed.

Panels 30, 32, 34, 36 are joined together, along adjacent vertical edges (such as edges 30a, 32a in FIG. 3), by elongated strips of flexible material, such as strip 40 shown in FIG. 3. These strips are fastened to the adjacent vertical edges of the panels which they join together, preferably by means forming a joint extending continuously along the panel edges. With the joint extending continuously, leakage of material such as flour at the corners of the container is inhibited, and maximum strength at the corners is realized. Thus, according in a preferred embodiment, a continuous adhesive joint is used to connect the edge of a panel to the margin of the strip that overlies it.

Strips 40 may comprise strips of fabric, plastic, or other flexible material, and since they are flexible, form a hinge connecting adjacent panels in the shell portion. Because of this, the shell portion may be collapsed, as shown in FIG. 4, when the end caps are removed. The shell portion when collapsed is ready for return shipment, and also in a condition where it can be easily fumigated.

As contemplated by this invention, panels 30–36 comprise plywood panels, such as the three-ply plywood panels illustrated in FIG. 3. In such a panel, plural cross bonded veneer layers are present, and the grain of the layers forming the outer faces of the panel extends horizontally between the vertical edges of the panel (the latter vertical edges being the ones joined by strips 40 to adjacent panels).

In using the container to hold a mass of flour, bottom cap 12 is first placed on a pallet, such as pallet 45, so as to be supported above the ground. The pallet selected ordinarily has a slightly greater length and width than the length and width of the bottom cap. Shell portion 10 is then squared, as shown in FIG. 1, and the shell portion then mounted on the bottom cap with the bottom thereof snugly fitted within recess 26. With the shell portion in place, the upstanding margins of the bottom cap fit snugly over the panels in the shell portion, with the grain of the layers forming the outer faces of the panels paralleling the length of the margins. The bottom cap functions to maintain a rectangular shape for the base of the shell portion, and to close it off. The overlap of the margins at the base of the shell portion effectively prevents flour from spilling out from the bottom of the container.

With the construction contemplated, when the shell portion is filled with flour, a rigid unit is produced, which unlike conventional containers, holds its shape throughout the entire length thereof. Further, tendencies for the container to burst open, particularly adjacent the base thereof, are notably absent. Stresses introduced when the container is filled with flour are borne substantially entirely by the panels forming the sides of the shell, and the strips that join them.

Considering in more detail the shape-retaining characteristics of the container, when the container is filled with flour or like material, the flour exerts forces on the panels forming the sides of the container tending to produce bowing of the panels, between both their side edges and their end edges. It has been discovered, however, that with the construction selected, and utilizing the panels of cross bonded veneer with the grain of the outer layers as described, a substantial volume of material may be held in the container without bowing or other distortion of the side panels. Apparently with the grain of the outer layers in the panels extending horizontally, there is sufficient rigidity in the panels to resist bending between the side edges, or about vertical axes. Bending between end edges (or about horizontal axes) is prevented by the continuous joint that connects each vertical edge of each panel to an adjacent panel. When the container is filled, in effect, a rigid column results having the same shape at the top as at the bottom, whereby top cap 14 is easily fit into place. The container, together with its contents, is sufficiently rigid to enable a similar container to be stacked on top of it, without such causing bursting or other failure in its sides, as illustrated in FIG. 5.

As already indicated, should one of the end caps be damaged (as by the tines of a forklift truck and the like), the same may be readily replaced, to make the container reusable. The plywood panels making up the sides of the shell portion resist most forms of hard use that would cause damage in other materials. The panels back up the overlying margins of the end caps, and thus protect these margins from accidental puncturing and other damage. In the event a panel should be damaged, the same is easily removed by disconnecting the strips joined to the edges of the panel. With the substitution of a new panel the container is again ready for use.

The container is easily dissassembled to prepare it for shipment by removing the end caps and folding up of the shell portion. By unfolding the flaps discussed forming the margins of the end caps, the end caps may be stacked in a small amount of room. In their dissassembled state, the various elements making up the container are easily fumigated with a gas to remove infestation. After fumigation, it is a simple matter to reassemble the container.

While there has been described a specific embodiment of the invention, it is appreciated that various changes may be made without departing from the invention. It is desired to cover all modifications and variations of the invention apparent to one skilled in the art, that come within the scope of the appended claim.

It is claimed and desired to secure by Letters Patent:

In the handling of bulk material such as flour and the like, a container for holding such material comprising, in operative position, a central shell portion comprising four substantially vertical panels, disposed with a pair of the panels in substantially parallel and oppositely disposed relation, and with the remaining two panels between the first-mentioned pair and disposed opposite each other in substantially parallel relation, the four panels thus forming a hollow four cornered box open at top and bottom ends with adjacent panels coming together at substantially right angles at the corners of the box;

elongated, substantially continuous, flexible strip means, connecting together adjacent vertical edges of an adjacent pair of panels at each corner of the box, through joinder to each panel substantially continuously throughout the length of the strip means, and forming a hinge between the pair of panels with such hinge extending between adajacent the top and bottom of the panels;

each of said panels comprising plural cross bonded veneer layers, odd in number, and having veneer layers over opposite outer faces of the panels with grain extending in a horizontal direction between the vertical edges of the panel, said strip means at each corner forming columnar structure at each corner of the shell portion extending transversely of the grain in the inner and outer faces of the panels forming the corner, which by joinder of the strip means substantially throughout its length to one of the panels forming the corner imparts the rigidity of this panel, in directions paralleling the plane of the panel, to the other panel forming the corner, the latter being substantially at right angles to the first-mentioned panel and also joined to the strip means substantially throughout the length of the strip means, said veneer layers in a cross-bonded panel which extend over opposite outer faces of the panel and because of their grain extending in a horizontal direction between the vertical edges of the panel resisting bowing of the panel about generally vertical axes, and means detachable from the shell portion closing off the opening at the bottom thereof; said means comprising a bottom cap including a base of rectangular outline, and an elongated margin extending along each side edge of the base and projecting upwardly therefrom; said shell portion being mounted on and within said bottom cap with each of its panels extending snugly along the inside of one of the margins of said bottom cap and with the grain in the opposite faces of the panel generally paralleling the length of the margin in the bottom cap.

References Cited by the Examiner

UNITED STATES PATENTS

| | | | |
|---|---|---|---|
| 687,610 | 11/1901 | Davidson | 217—17 |
| 935,748 | 10/1909 | Fenlason | 217—17 |
| 2,693,894 | 11/1954 | Elmendorf | 217—17 |
| 2,762,551 | 9/1956 | Fallert | 229—23 |
| 3,076,589 | 2/1963 | Meijdam | 229—34 |

FOREIGN PATENTS

| | | |
|---|---|---|
| 474,072 | 5/1951 | Canada. |
| 386,092 | 1/1933 | Great Britain. |

LOUIS G. MANCENE, *Primary Examiner.*

THERON E. CONDON, *Examiner.*